Oct. 15, 1963  M. H. JACHTER  3,107,299
APPARATUS FOR CALIBRATING RADIATION MEASURING DEVICES
Filed Feb. 2, 1962  3 Sheets-Sheet 1

INVENTOR,
MARTIN H. JACHTER.

BY Jack H. Linscott

ATTORNEY.

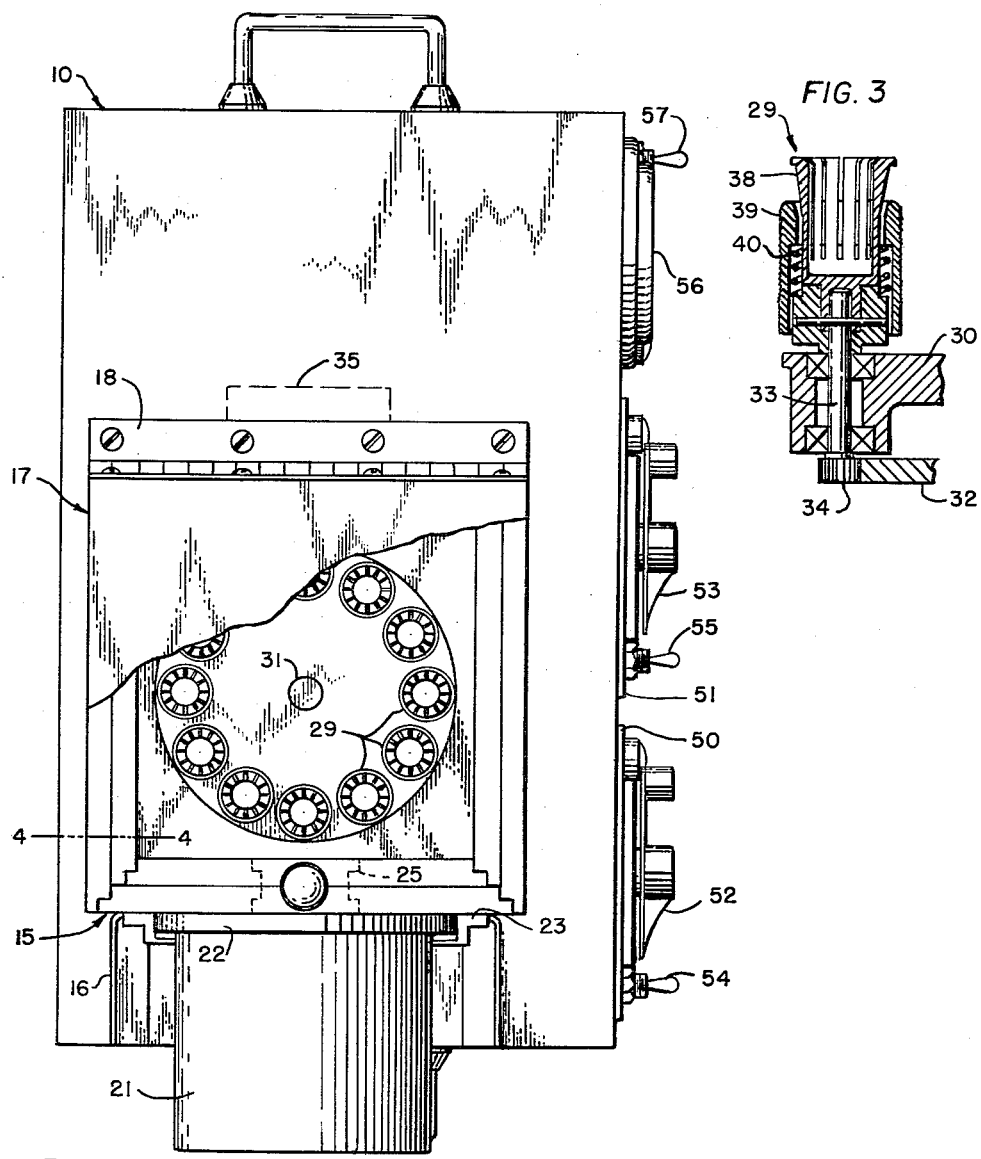

United States Patent Office 3,107,299
Patented Oct. 15, 1963

3,107,299
APPARATUS FOR CALIBRATING RADIATION
MEASURING DEVICES
Martin H. Jachter, Middletown, N.J., assignor to the
United States of America as represented by the Secretary of the Army
Filed Feb. 2, 1962, Ser. No. 170,853
10 Claims. (Cl. 250—83)
(Granted under Title 35, U.S. Code (1952), sec. 266)

The invention described herein may be manufactured and used by or for the Government for governmental purposes, without the payment of any royalty thereon.

This invention relates to apparatus for calibrating radiation measuring devices (dosimeters) and particularly to such apparatus capable of applying a test radiation beam to a plurality of dosimeters omnidirectionally for a measured period of time.

With the continued development and expansion in the use of high intensity radiation sources and in military application of nucleonic devices it becomes vital to develop reliable means for checking the accuracy of all field strength measuring devices. All such devices must be periodically checked to insure adequate accuracy. This applies not only to laboratory measuring instruments used in research and development but also to instruments for insuring the safety of personnel such as radiac devices and dosimeters.

To perform such checking operations reliably constant sources of radiation must be provided such as an assayed gamma ray source. It follows that the source must be safely shielded and adequate controls for its use must be implemented.

Heretofore the shielding system and the safety controls required for the use of such powerful sources have been very heavy and of such a nature that they could not be fabricated into a portable system but on the contrary such systems have been housed as permanent installations. Only a few such checking installations exist and they are to be found only at points geographically separated by relatively great distances. In many instances as a result of this condition the instruments to be checked must be transported to and from a remote checking station which is a waste of time and expense.

A further factor which has caused great inconvenience and waste of time is compliance with the necessary safety rules in handling the powerful radiation sources used for this purpose. These rules require that operatives using this equipment must have extended periods of training before they are permitted to use the apparatus.

The present invention uses radiation sources of relatively low intensity which require only light weight shielding which can be incorporated into small portable equipment serving the same purpose as the costly permanent installations at greatly reduced cost. Moreover it is feasible to provide large numbers of these portable devices and thus service all areas using the measuring devices in an efficient and effective manner.

The invention is particularly directed to the type of measuring device commonly known as a dosimeter. The dosimeter is adapted to be worn on the person of one subjected to a radiation field and indicates the cumulative dose of radiation to which it has been exposed over a period of time such as for a number of hours or days. Thus the dosimeter shows the number of rads to which a person wearing the device has been subjected and thereby serves to guard against an overdose of radiation.

To check its accuracy the dosimeter must be subjected to radiation of known intensity for a measured period. The present invention provides a novel apparatus for irradiating a plurality of dosimeters with a source of known intensity for a measured time period while providing protection for those who operate the device.

The invention basically provides an enclosure of shielding material within which a plurality of dosimeters to be checked are received. A radiation source is housed in a separate safety container including its own shielding. The source may be an assayed strontium 90-yttrium 90 beta ray emitting material, or similar material such as krypton 85. Its container is fastened to the dosimeter enclosure and has a small opening to emit the rays in the direction of the enclosure.

A door or valve is slidably received in a wall of the enclosure in position to control the flow of radiation from the source to the chamber in the enclosure. The dosimeters are held in a plurality of chucks rotatably mounted in a turret member which itself is rotatable. A motor drives the turret and the chucks which are thereby rotated on their own axis and are moved bodily in a circular path within the chamber. Thus the dosimeters are uniformly irradiated.

Automatic timing means is provided for measuring the exposure period and novel safety devices prevent escape of radiation at any time.

It is a primary object of the invention to provide a portable light weight apparatus for checking or calibrating radiation measuring devices.

A further object of the invention is to provide a portable radiation checking device having a shielding system of light weight and an interlocking control system for preventing escape of radiant energy at all times.

A further object of the invention is to provide a radiation measuring device having efficient means for uniformly irradiating devices to be tested.

A further object of the invention is to provide a radiation measuring device having means for simultaneously testing a plurality of devices each receiving a precise and equal dose of radiation.

A still further object of the invention is to provide a radiation measuring device having a beta ray test source and a shielding system composed of superposed sheets of plastic and metal such as aluminum wherein the beta rays are adsorbed and slowed down and the gamma rays produced by such absorption in the plastic are in turn absorbed by the metal.

A further object of the invention is to use a beta ray source for irradiating the dosimeters to produce an ionization rate within the ionization chamber of the dosimeters which is much higher than that produced by irradiating the dosimeters with a gamma ray source of equivalent intensity.

Other objects and features of the invention will more fully appear from the following description and will be particularly pointed out in the claims.

To present a better understanding of the invention a particular embodiment thereof will be described and illustrated in the accompanying drawings wherein:

FIG. 2 is a plan view of the device shown in FIG. 1 with portions broken away.

FIG. 3 is a detail cross sectional view of the mechanism for holding the devices to be checked.

FIG. 4 is a detail illustration of an automatically operated safety switch for preventing accidental escape of harmful rays.

The elements of the invention are incorporated in an integrated unit having a base portion 10 which desirably constitutes an enclosure for some of the operating elements of the apparatus.

Figure 1:
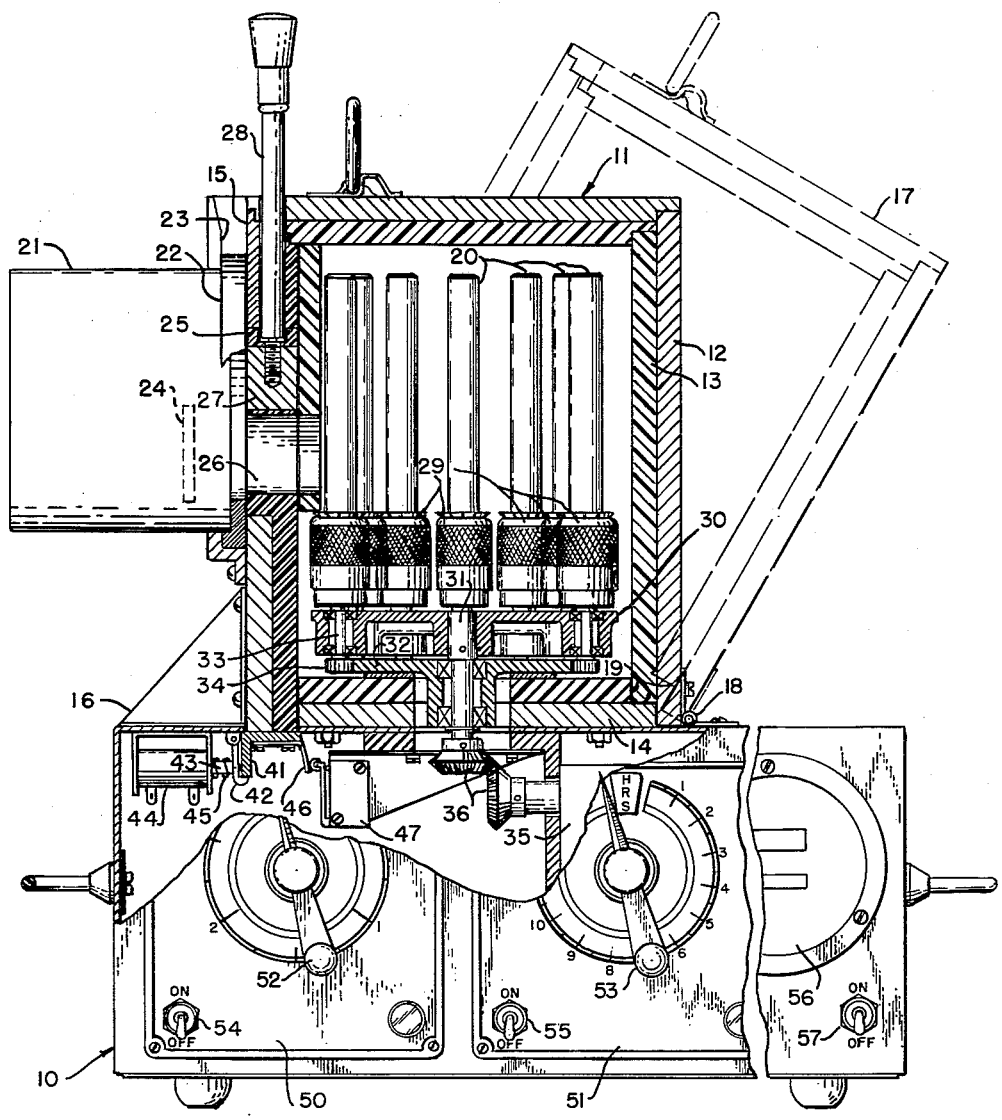
FIG. 1 is a side view of the device of the invention with parts thereof shown in section.
Figure 5:
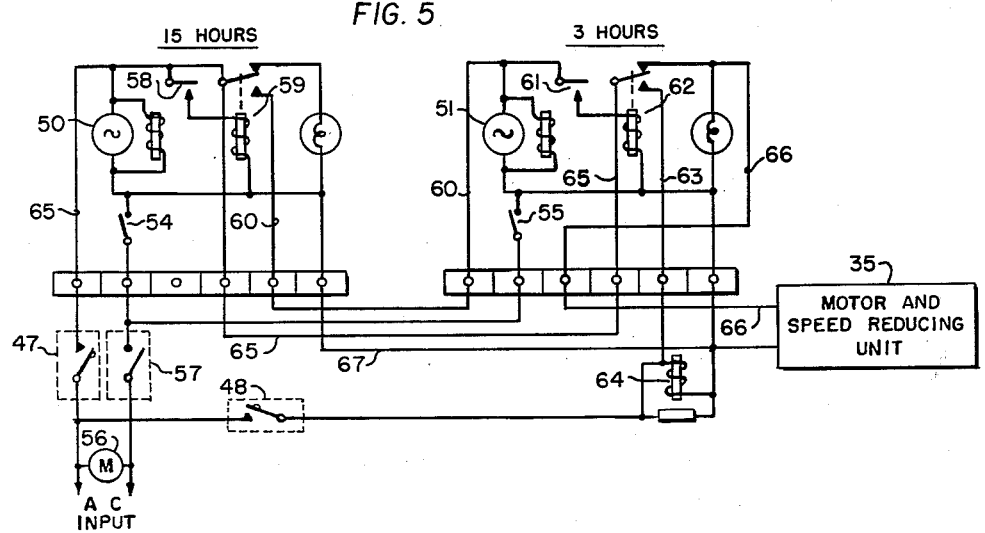
FIG. 5 is an electrical diagram of the circuits incorporated in the apparatus.
Figure 6:
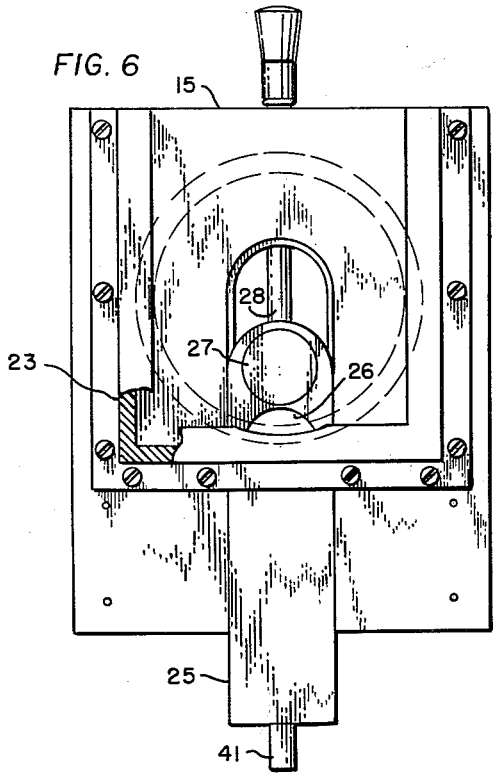
FIG. 6 is a detail illustration of the means for controlling the flow of radiant energy in the apparatus.

On top of the base structure is received a shielding housing 11 within which the devices to be checked are received. This housing may be made of any suitable material which is impervious to the rays. It has been found that a suitable shield for the strontium 90-yttrium 90 beta ray source is to construct the walls of the housing 11 of laminated panels consisting of sheets of aluminum 12 and suitable plastic sheets 13 such as polystyrene. The bottom wall 14 is secured to the top of the base portion 10 and the left hand side wall 15 as shown in FIG. 1, is also secured in vertical position to the top of the base portion 10 by a pair of brackets 16.

The remaining walls of the housing are made into a unitary structure 17 which is pivoted along the bottom of the right hand wall to the base structure 10 by a piano hinge 18. Thus by swinging the structure 17 to the right complete access to the elements in the housing is assured, and when it is swung into closed position total shielding is provided. The edges of the wall sections are so constructed that the laminations thereof have overlapping and interengaging relation as shown at 19. This construction insures trapping the rays within the housing.

The use of plastic and metal in the walls of the housing 11 produces a highly effective shield against the beta rays. It has been found that 3/8 inch thick plastic such as polystyrene and the same thickness of metal, such as aluminum, will provide safety for operators of the apparatus. The combined effect of the two specific superposed materials produces a highly effective and light weight shield. The plastic constitutes the inner portion of walls and the metal constitutes the outer layer thereof. The beta rays are first absorbed and slowed down by the plastic and gamma rays produced by such absorption are then absorbed by the metal.

A beta emission source has the valuable property of producing a high rate of ionization in the ionization chamber of the dosimeters and at the same time such beta radiation is readily controlled for the protection of an operator as above pointed out; whereas emission from a gamma source of equivalent intensity will produce only a small ionization rate in the dosimeters and protection for an operator is relatively difficult to achieve. This phenomenon results from the fact that beta rays are heavier and more effective ionization agents than the gamma photons produced by gamma rays in an ionization chamber.

A plurality of dosimeters are received within the housing 11 and held in vertical position in holders to be described hereinafter. The dosimeters 20 are of the integrating type for recording total dose incident thereon in rads or other quantitative units. To calibrate them or to check their prior calibration they are irradiated by a source such as an assayed strontium 90-yttrium 90 beta ray emitter or similar source for a measured period of time.

The source is contained in a housing 21 of its own detachably secured to the fixed wall 15 of the housing 11. As shown the housing 21 is provided with a flange 22 which is slidably received in a retaining structure 23. The emitting source 24 may be of conventional plate like construction directing a beam of rays through an aperture in its housing. Various emitting sources may be used by substituting one prepared specimen for another simply by changing one housing containing the specimen for another. Each housing 21 is provided with means for closing its emitting aperture which is put in place when the source is removed from the apparatus.

Flow of energy from the source 24 into the housing 11 is controlled by a door like valve number 25 slidably received in the fixed wall 15. The valve member is provided with an aperture 26 which registers with a similar aperture in the housing 21 to permit flow of radiation to the housing 11. To stop flow of radiation the valve is moved downward to its closed position which positions a plate of lead 27 into the path of the rays. The valve is opened by manually pulling upward on a rod 28 secured thereto and is automatically closed at the end of a testing cycle in a manner to be described.

The dosimeters 20 are held in vertical position by a series of friction chucks 29 into which they are inserted. The chucks are rotatively mounted along the periphery of a base member 30 which in turn is rotatively mounted upon a vertical shaft 31 supported in ball bearings in the bottom wall 14 of the housing 11. The shaft 31 extends through the hub of a gear 32 fixed to the bottom wall 14. The chucks are secured to shafts 33 which extend through and have a bearing in the base 30. Each shaft 33 has a gear 34 secured to its bottom end which mesh with the fixed gear 32.

The shaft 31 and the base 30 are driven by a motor and speed reducing unit 35 and a pair of bevel gears 36. The clutches and the dosimeters are thus rotated upon their own axes and are bodily moved in a circle by the motor 35. The dosimeters are so positioned in the housing 11 that the beam of energy from the source will be incident upon the sensitive elements therein.

As the dosimeters move in the manner stated they are all subjected to identical doses of radiation. Their movement substantially follows the same conditions of exposure that would take place if they were worn by a person. That is the radiation is applied in all directions upon each dosimeter. Furthermore a more accurate calibration of all dosimeters is achieved because they all move to the same extent through the varying field intensity set up by the natural diffusion of the energy which takes place within the housing as the rays enter from the source. Thus the dosimeters all receive a measured dose of energy determined by the field strength and the time period of application of the rays.

FIG. 3 illustrates the details of the structure of the chucks 29. A holding member 38 is fixedly mounted upon the upper end of the shafts 33. The holders are provided with a plurality of flaring spring fingers at their upper end. A sliding collar 39 surrounds the spring fingers and is urged upward by a spring 40 which is seated upon the base portion of the holding member 38. The collar 39 forces the spring fingers inward. To insert a dosimeters the collar 39 is pulled downward to release the inward pressure on the fingers. While held downward the dosimeter is inserted and the collar is released which causes the fingers to firmly grip the casing of the dosimeter.

As above stated the controls for the apparatus are designed to protect the operator from accidental exposure to harmful rays and in addition automatic timing means measures the duration of the exposure of the devices tested. For protection against the rays the operation of the valve 25 is made dependent upon whether or not the movable portion 17 of housing 11 is in open or closed position. For this purpose an electrically operated latching relay is provided having a striker plate 41 secured to the bottom of the valve 25. Coacting with this plate is a latch 42 pivoted upon the top wall of the base 10 and having pivoted connection with the armature 43 of a solenoid 44 connected in the circuit of the system as will appear hereinafter. A spring 45 surrounding the armature urges the latch into latching engagement with the plate 41 when the valve is in its upper position as shown in FIG. 1, at which time the passage between the source and the housing is open. When the solenoid is energized however the armature 43 retracts the latch and the valve drops by gravity into its closed position.

Attached to the bottom of the valve also is an actuating arm 46 adapted to engage the arm of a microswitch 47. The arm 46 and the switch 47 are positioned to effect closing of the switch when the valve 25 is in its upper or open position as shown in FIG. 1 and to permit the switch to open when the valve 25 is closed. The switch 47 is connected in the power supply circuit of the device.

Means are provided for preventing accidental escape of rays when the valve 25 is open. To accomplish this end a contact or limit switch 48 is placed in position to be actuated by the bottom edge of the hinged structure 11 as shown in FIG. 4. Desirably this may be done by mounting the switch within the base member and projecting its actuating plunger 49 upward through the top wall of the base structure in position to be contacted and pressed downward when the structure 17 is closed. This switch is connected in a circuit from the input power supply to the solenoid 44 of the latching relay so that when the structure 17 is in open position the switch is closed and when the housing 11 is closed the switch is open.

A pair of timing clocks 50 and 51 are received within the base 10 having their controls extending through the front wall thereof. Each clock is provided with time period adjusting arms 52 and 53 and on off switches 54 and 55. A frequency meter 56 is also housed in the base and may be connected into the supply circuit to identify the frequency of the line current. If other than the frequency for which the device is designed to use is indicated correction must be made in the time intervals appearing on the clock faces. Although a single clock may be used more accurate timing and a greater range of timing cycles are available by employing two clocks which are arranged to act alone or in series to produce the required interval. The clocks are of conventional structure having synchronous motors to measure the timing cycles and an on off switch for controlling input power at the beginning and end of the cycle. One clock has a total range of 15 hours and the other a range of 3 hours. Clocks with any suitable timing range may be used.

Other means than the timing clocks 50 and 51 may be used to measure the period of irradiation. Since the motor in the unit 35 is of the synchronous type it may serve to drive a timing device of the cycle counting register type having adjustable means to establish the time period.

It will be noted that the device of the invention is capable of completing the checking operation without additional equipment and that the whole assembly is compact and light in weight which renders it entirely portable and thus may be carried to any specific location where servicing of large numbers of dosimeters may be accomplished immediately and returned to service.

Operation of the device is as follows. Referring to the electrical diagram in FIG. 4 and starting with the shut down condition of the apparatus that is with no dosimeters in the housing and the main switch 57 open, the dosimeters are loaded into their chucks 29. To do this the hinged section 17 of the housing 11 is swung open. Normally at this time the valve 25 should be closed as a result of completing the last operating cycle the last time the device was operated. If it is open the act of opening the housing will immediately close the switch 48 which through the interconnected circuits to the latching relay will unlatch the valve which will fall by gravity to shut off the rays.

The dosimeters or other devices to be checked are then inserted in their chucks 29 after which the housing is closed which automatically opens the circuit to the latching relay which in turn conditions this device to function as a latch. The time period for exposing the dosimeters is then established by setting the arms 52 and 53 to their respective required position and closing either one or both of their control switches depending upon the time period desired. The main switch 57 is then closed and the rod 28 pulled upward until the latch 42 engages the arm of the normally open microswitch 47 which closes the circuit from the power supply to the driving motor and speed reducing unit 35 which in turn moves the dosimeters in a path defined by the gears 32 and 34 while they receive their exposure. A more detailed explanation of the current paths including the timing clocks will appear hereinafter. At any time during the exposing cycle if the housing 11 is accidentally opened the switch 48 will close and the latching relay will trip the latch to cause the valve 25 to close preventing escape of the rays.

When both switches 54 and 55 are closed the clocks function in series to establish the total time period. At the end of the time period clock 50 will close its switch 58 to energize relay 59 which closes circuit 60 which in turn starts clock 51 which completes its timing cycle and closes its switch 61 which in turn energizes the relay 62 which closes the circuit 63 leading to the latching relay 64 which closes the valve 25 and opens the circuit to the motor and speed reducing unit 35 thus completing the cycle.

The housing is then opened and each dosimeter is removed and checked for accuracy by noting the position of their indicators with respect to the position marked thereon as indicating the dosage to which they have been exposed.

To operate the clock 50 alone its switch 54 is closed. The clock 51 set at zero and its switch is closed. Assuming the dosimeters are in place, the housing closed, the valve 25 open and the main switch closed the cycle will be initiated. At this time the circuit to the unit 35 is completed from the lead 65 of the supply line to relay 62 of clock 51 which is in inactivated state and thence through lead 66 to the unit 35 and from the unit back through line 67 to the other side of the power supply.

At the end of the cycle the switch 58 will close to energize the relay 59 which closes the circuit through the line 60 to the switch 61 which at this time is closed since the clock 51 is set at zero. The relay 62 is thus actuated which energizes the line 63 to the latching relay thus ending the cycle.

Clock 51 may be actuated alone by setting its time cycle, closing its switch 55, establishing the other cycle initiating conditions as above outlined and with clock 50 set on zero. When the main switch is now closed the clock is started and the unit 35 energized to start the cycle. At this time power is flowing from the supply line 65 to and through relay 62 and thence to line 66 to the unit 35 and back from the unit through line 67 to the other side of the power supply. At the end of the cycle, clock switch 61 closes to activate relay 62 which closes the circuit to line 63 which actuates the latching relay 64 to end the cycle. An audio signal device such as a buzzer may be connected across the terminals of the solenoid 44. A continued sounding of the signal will indicate a malfunction of the protective system has occurred.

In connection with the shielding material out of which the housing 11 is made it should be pointed out that many different plastics may be used which are organic and within the class which are air equivalent and have the proper characteristics for stopping beta rays. Any suitable metal may be used for the outer layer of the housing such as ferrous metals and lead. The high Z materials are the most efficient absorbers for this bremsstrahlung radiation. However practical considerations make aluminum the absorber of choice.

What is claimed is:

1. Apparatus for calibrating radiation measuring devices comprising a shielded housing for receiving a plurality of devices to be checked, a shielded assayed beta ray source removably attached to said housing, a channel between the source and housing for the passage of rays, an automatically closing manually opening valve to control the passage of rays in said channel, said housing having at least a portion thereof removable to gain access thereto, a power supply for operating the apparatus, electromagnetic latching means connected to the power supply acting to hold said valve in open position when de-energized, switching means in the circuit to said electromagnetic latch operable by removal and replacement of the removable section of said housing to unlatch said valve to permit it to close when said section is removed and to hold the valve open when the section is replaced, timing means for measuring the duration of the irradiation cycle of said devices, electric motor driven means for moving the devices within said housing, an electric switch in the power supply to said motor and timing means actuated into closed position when said valve is open and into open position when said valve is closed and switching means in the circuit to said electromagnetic latching means operable to unlatch said valve to permit it to close when said timing means has completed its cycle thereby to cut off the rays from the source to the housing and to stop said motor.

2. Apparatus for calibrating radiation measuring devices comprising, an assayed beta ray radiation source, a shielded housing for containing a plurality of instruments to be checked, said housing consisting of two sections, a fixed section and a removable section operable to open and close the housing, a communicating channel between the said radiation source and housing, an automatically closeable valve member for closing said channel, a rotating turret member in said housing, holders on said turret for carrying the instruments to be checked, a motor to drive said turret, a power supply circuit for operating the apparatus, timing means for operating the apparatus for a measured time period, an electrically operated latching relay in said circuit, said relay operable to lock the valve member in open position when de-energized and to close the valve when energized, a switch in the operating circuit of said latching relay, means to close said switch when said housing is closed thereby preventing said valve from latching in open position, a second switch in said power supply circuit operable to energize the apparatus when said valve is open and to de-energize the apparatus when the valve is closed.

3. Apparatus for calibrating radiation measuring devices comprising, a shielded assayed beta ray radiation source, a shielded housing for containing a plurality of devices to be checked, a communicating channel between said ray source and said housing, a slidable valve member having yielding means for normally moving it into channel closing position, a rotating turret member in said housing having a plurality of holders to receive said devices rotatably mounted in said turret, a motor to drive said turret and means for rotating said holders from the rotating turret, an input circuit connected to a power source, timing means in said circuit for measuring the duration of exposure of said devices to the source, a normally open spring lever actuated switch in said circuit, means on said sliding valve operable to close said switch when the valve is open and to permit said switch to open when the valve is closed, a spring actuated latch for holding the valve in open position, electromagnetic means in said circuit operable when energized to retract said latch to release said valve and permit it to close, a switch actuated by said timing means at the end of the measured period operable to close the circuit to said electromagnetic means thereby to close said valve.

4. Apparatus for calibrating radiation measuring devices comprising a shielded assayed beta ray source, a shielded housing to receive said devices, means to open and close said housing, a channel between said source and said housing, a valve to control the flow of energy in said channel, automatic means to close said valve when said housing is open, timing means for determining the period of irradiation of the devices, means actuated by the opening of said valve operable to start said timing means, means connected to said timing means operable to close said valve at the end of the measured irradiation period, means in said housing for holding a plurality of devices to be calibrated and electric power means for moving said holders and devices in a circuitous path within said housing.

5. Apparatus for calibrating radiation measuring devices comprising a shielded assayed beta ray source, a shielded housing to receive said devices said housing being constructed of superposed layers of organic plastic of the air equivalent type and light weight metal the inner layer being plastic material, means to open and close said housing, a channel between said source and said housing, a valve to control the flow of energy in said channel, automatic means to close said valve when said housing is open, timing means for determining the period of irradiation of the devices, means actuated by the opening of said valve operable to start said timing means, means connected to said timing means operable to close said valve at the end of the measured irradiation period.

6. Apparatus for calibrating radiation measuring devices comprising a shielded assayed beta ray source, a shielded housing to receive said devices, means to open and close said housing, a channel between said source and said housing, a valve to control flow of energy in said channel, an electronic circuit containing a power source, an electromagnetically operated latch in said circuit operable to latch said valve in open position, a switch to control said latch actuated into closed position when said housing is open, said switch assuming its open position when said housing is closed whereby said latch holds said valve in open position when said housing is closed and releases said valve to permit it to close when said housing is open, timing means for determining the period of irradiation of the measuring devices, a second switch in said circuit actuated by the opening of said valve to start said timing means and switching means in said circuit actuated by said timing means to energize said electromagnetic latch to close said valve at the end of the measured irradiation period.

7. Apparatus for calibrating radiation measuring devices comprising a shielded assayed beta ray source, a shielded housing to receive said devices, means to open and close said housing, a channel between said source and said housing, a valve to control the flow of energy in said channel, automatic means to close said valve when said housing is open, timing means for determining the period of irradiation of the devices, means actuated by the opening of said valve operable to start said timing means, means connected to said timing means operable to close said valve at the end of the measured irradiation period, means in said housing for holding a plurality of devices to be calibrated, electric power means for moving said holders and devices in a circuitous path within said housing, a switch for controlling said power means and means on said valve for closing said switch to start said power means when the valve is open and to open said switch when the valve is closed thereby to control said power means.

8. Apparatus for calibrating radiation measuring devices comprising a shielded housing for receiving a plurality of devices to be checked, a shielded assayed beta ray source removably attached to said housing, a channel between the source and housing for the passage of rays, an automatically closing manually opening valve to control the passage of rays in said channel, said housing having at least a portion thereof removable to gain access thereto and a fixed vertical wall within which said valve is slidably received, a power supply for operating the apparatus, electromagnetic latching means connected to the power supply acting to hold said valve in open position when de-energized, switching means in the circuit to said electro-magnetic latch operable by removal and replacement of the removable section of said housing to unlatch said valve to permit it to close when said section is removed and to hold the valve open when the section is replaced, timing means for measuring the duration of the irradiation cycle of said devices, electric motor driven means for moving the devices within said housing, an electric switch in the power supply to said motor and timing means actuated into closed position when said valve is open and into open position when said valve is closed and switching means in the circuit to said electromagnetic latching means operable to unlatch said valve to permit it to close when said timing means has completed its cycle thereby to cut off the rays from the source to the housing and to stop said motor.

9. Apparatus for calibrating radiation measuring devices comprising a shielded housing for receiving a plurality of devices to be checked the walls of said housing being made of laminated sheets of aluminum and air equivalent organic plastic, a shielded assayed beta ray source removably attached to said housing, a channel between the source and housing for the passage of rays, an automatically closing manually opening valve to control the passage of rays in said channel, said housing having at least a portion thereof removable to gain access thereto, a power supply for operating the apparatus, electromagnetic latching means connected to the power supply acting to hold said valve in open position when de-energized, switching means in the circuit to said electromagnetic latch operable by removal and replacement of the removable section of said housing to unlatch said valve to permit it to close when said section is removed and to hold the valve open when the section is replaced, timing means for measuring the duration of irradiation cycle of said devices, electric motor driven means for moving the devices within said housing, an electric switch in the power supply to said motor and timing means actuated into closed postiion when said valve is open and into open position when said valve is closed and switching means in the circuit to said electromagnetic latching means operable to unlatch said valve to permit it to close when said timing means has completed its cycle thereby to cut off the rays from the source to the housing and to stop said motor.

10. Apparatus for calibrating radiation measuring devices comprising a shielded housing for receiving a plurality of devices to be checked, a shielded assayed beta ray source removably attached to said housing, a channel between the source and housing for the passage of rays, an automatically closing manually opening valve to control the passage of rays in said channel, said housing having at least a portion thereof removable to gain access thereto, a power supply for operating the apparatus, electro-magnetic latching means connected to the power supply acting to hold said valve in open position when de-energized, switching means in the circuit to said electromagnetic latch operable by removal and replacement of the removable section of said housing to unlatch said valve to permit it to close when said section is removed and to hold the valve open when the section is replaced, timing means for measuring the duration of the irradiation cycle of said devices, electric motor driven means for moving the devices within said housing, an electric switch in the power supply to said motor and timing means actuated into closed position when said valve is open and into open position when said valve is closed, switching means in the circuit to said electromagnetic latching means operable to unlatch said valve to permit it to close when said timing means has completed its cycle thereby to cut off the rays from the source to the housing and to stop said motor, a rotatable turret within said housing driven by said motor, a plurality of rotatable holders to receive said devices and means to rotate the holders deriving motivation from the motion of said turret.

References Cited in the file of this patent
UNITED STATES PATENTS

| | | |
|---|---|---|
| 2,967,942 | Davis | Jan. 10, 1961 |
| 3,064,130 | Di Ianni | Nov. 13, 1962 |